G. W. AND E. B. CALEF.
GAS BURNER.
APPLICATION FILED NOV. 23, 1918.
1,316,682.
Patented Sept. 23, 1919.
2 SHEETS—SHEET 1.
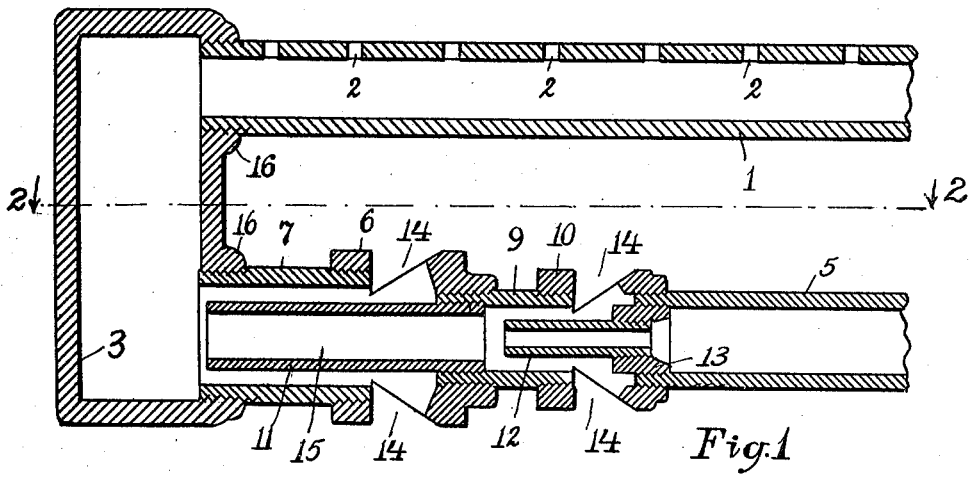
Fig. 1
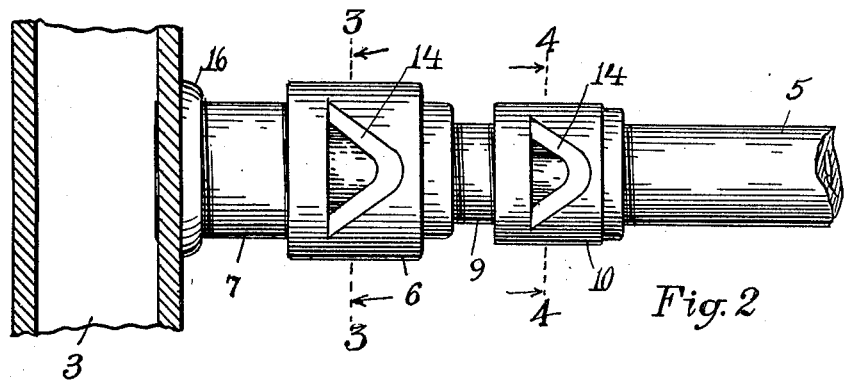
Fig. 2
Fig. 3
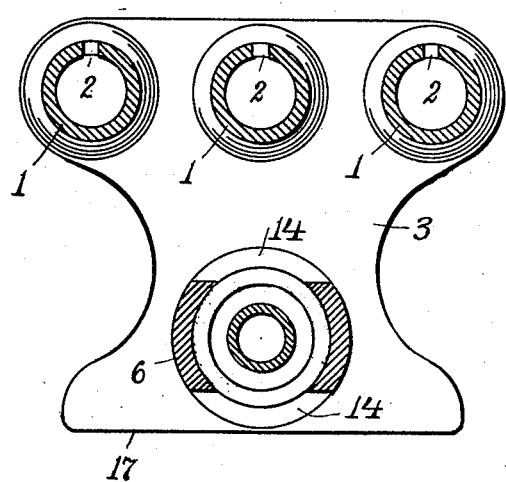
Fig. 4
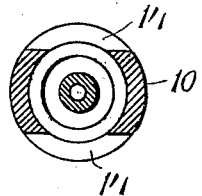
Inventors,
Ephraim B. Calef,
George W. Calef;
By
Attorney.

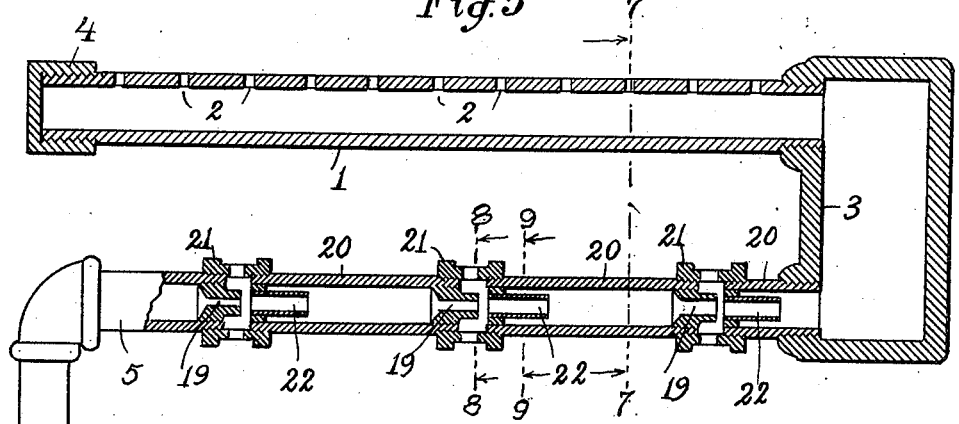
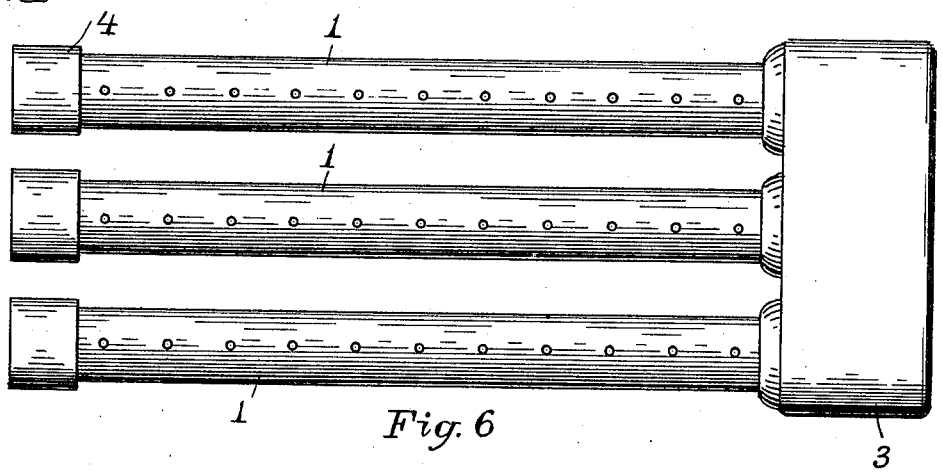
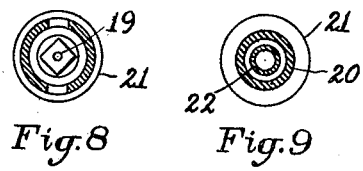
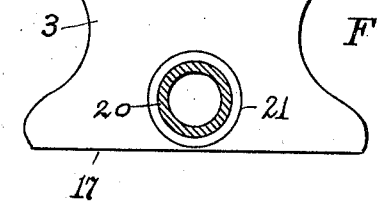

UNITED STATES PATENT OFFICE.

GEORGE W. CALEF AND EPHRAIM B. CALEF, OF BOSTON, MASSACHUSETTS.

GAS-BURNER.

1,316,682.

Specification of Letters Patent. Patented Sept. 23, 1919.

Application filed November 23, 1918. Serial No. 263,843.

*To all whom it may concern:*

Be it known that we, GEORGE W. CALEF and EPHRAIM B. CALEF, both citizens of the United States, and residents of the city of Boston, in the county of Suffolk and Commonwealth of Massachusetts, have invented certain new and useful Improvements in Gas-Burners, of which the following is a full, clear, and exact specification.

The object of this invention is the effecting of the improvements in gas burners for heating and cooking purposes hereinafter set forth and illustrated in the accompanying drawings, in which Figure 1 is a side sectional elevation of a burner embodying my improvements. Fig. 2 is a horizontal section on the line 2—2 in Fig. 1. Fig. 3 is a cross section on the line 3—3 in Fig. 2. Fig. 4 is a cross section on the line 4—4 in Fig. 2 of the feed pipe alone. Fig. 5 is a side sectional elevation of another form of the invention. Fig. 6 is a plan view of the same. Fig. 7 is a cross section on the line 7—7 in Fig. 5. Fig. 8 is a cross section of the feed pipe alone on the line 8—8 in Fig. 5, and Fig. 9 is a cross section on the line 9—9 in Fig. 5.

As shown in Figs. 1 and 6, the burner tubes 1, each formed with a row of small holes 2, are tapped into a hollow header 3, and arranged in a substantially horizontal plane parallel with each other. As indicated in Fig. 5, each tube 1 is closed at its outer end in any suitable manner, as by the screw cap 4. The gas is fed to the header 3 from any suitable source through a pipe 5, between which and the lower part of the header are a plurality of air intermixing devices, shown in Figs. 1 and 2 as two in number, and in Fig. 5 as three in number.

In the structure illustrated in Figs. 1 to 4, an internally threaded collar 6 is screwed upon short sections of tubing 7 and 9, the section 7 being the larger and the one which communicates directly with the lower part of the header 3. Upon the outer end of the section 9 is screwed a second internally threaded collar 10 substantially smaller than the collar 6, and into the collar 10 is screwed the end of the supply pipe 5.

Within the end of the section 9 is screwed an end of a tube 11 sufficiently smaller in diameter than the section 7 to leave an ample space between, thus tube 11 terminating in approximately the same plane as does the section 7 within the header. A similar but much smaller tube 12 is supported in the end of the feeder pipe 5, a reducing bushing 13 being introduced between the two parts for holding them together.

Radially through each collar 6 and 10 are formed by preference two openings for air-intake, designated by the numeral 14, the same being formed by cutting out a segmental bit of the metal. We do not, however, restrict ourselves to this method of making the openings, as they may be drilled readily through the wall of the collar as shown in Figs. 5 and 8.

It should be observed that the channel through the tube 12 is smaller than the passage 15 through the tube 11, and that the annular space exterior to the tube 12 is less than that about the tube 11, for the purposes hereinafter set forth.

The header 3 we prefer to make from cast iron, with bosses 16 for the reception of the tubes 1 and 7, and to form it with a substantially flat base 17 very nearly flush with the under surfaces of the feeder tube 5. This enables the burner to be placed upon the grate of a fire-pot and to stand thereon with firmness.

The operation of the burner illustrated in Figs. 1 to 4 is as follows: The gas entering the tube 5 jets out through the slender tube 12 into the larger tube 11, creating a suction which draws in through the openings 14 a considerable quantity of air. This gas and air pass on through the tube 11 into the interior of the header 3, similarly drawing in with it through the holes 14 in the collar 6 a further supply of air. The gas and air thus introduced within the header passes on to the tubes 1 and escapes through the holes 2, and being set afire, burns with a blue and intensely hot flame. So perfect is the combustion that is effected through a pluralized air-intermixing that the flames yield not a particle of carbon, and dishes held over the same collect no discernible soot.

By having the feeder tube 5 beneath the burner tubes, the gas passing through it and the air entering the holes 14 become quite hot and thereby further aids in the combustion.

It is essential that the tubes 12 and 11 shall be unequal, with the larger nearer the header, not only because the intermixed air and gas require greater passageway than does the gas alone, but because of the considerable expansion of the gas and air due to heat as they near the header.

In the construction illustrated in Figs. 5 to 9, while like that above described in essentials, we show a plurality of three air-intermixing devices. In these, the jetting channels 19 are shorter than those first described, and are cast iron, with their ends square, as shown in Fig. 8, to enable them to be screwed into place. But here, also, the channels 19 are made to be larger as they approach the header 3, but the tubular sections 20 are all of the same size, as are the collars 21, and the tubes 22.

What we claim is:

1. A burner comprising a hollow header, a plurality of tubes connected therewith near its upper section each having a row of burner holes, a pipe connected with the lower section of said header parallel with said tubes for the delivery of intermixed air and gas to the header, the base of said header being laterally extended for suitably supporting the burner upon any substantially flat surface.

2. A burner comprising a hollow header, burner tubes connected therewith, a gas receiving tube, a collar attached to the end of said receiving tube having radial openings through it, a short section of tubing projecting from within said collar, a jetting tube supported by said gas receiving tube projecting within said short section but spaced therefrom, a second jutting tube supported by said short section and reaching substantially to the header but of larger diameter than the first jetting tube, a second collar mounted on said short section having radial openings through it, and a second short section of tubing connecting the second collar to the header spaced from the second jetting tube.

In testimony that we claim the foregoing invention we have hereunto set our hands this 19th day of November, 1918.

GEORGE W. CALEF.
EPHRAIM B. CALEF.

Copies of this patent may be obtained for five cents each, by addressing the "Commissioner of Patents, Washington, D. C."